United States Patent [19]

Tsuruta

[11] 3,971,425

[45] July 27, 1976

[54] PROCESS AND DEVICE FOR AUTOMATIC REGULATION OF THE INTERNAL PRESSURE IN A PNEUMATIC TIRE

[76] Inventor: Yasuo Tsuruta, 22-2, 4-chome, Sanno, Ota, Tokyo, Japan

[22] Filed: Mar. 31, 1975

[21] Appl. No.: 563,657

[30] Foreign Application Priority Data
Sept. 6, 1974    Japan............................. 49-101974
Feb. 12, 1975    Japan............................. 50-16937
Feb. 26, 1975    Japan............................. 50-22748

[52] U.S. Cl................................. 152/418; 152/10
[51] Int. Cl.²........................................ B60C 23/12
[58] Field of Search................................ 152/8–10, 152/418, 419, 415

[56] References Cited
UNITED STATES PATENTS

| | | | |
|---|---|---|---|
| 1,035,207 | 8/1912 | Libby | 152/418 |
| 2,439,188 | 4/1948 | Sage | 152/418 |
| 2,742,075 | 4/1956 | Courchesne | 152/418 |
| 2,871,906 | 2/1959 | Courchesne | 152/418 |
| 2,939,504 | 6/1960 | Bedford, Jr. | 152/418 |

Primary Examiner—Drayton E. Hoffman
Attorney, Agent, or Firm—Brisebois & Kruger

[57] ABSTRACT

The present invention relates to a process and device for the automatic regulation of the internal pressure in a pneumatic tire characterized in that the air is forced into the pneumatic chamber of a tire by the centrifugal force generated by the revolution of the wheel, and the pressure inside said pneumatic chamber can thereby be automatically changed in dependence on the speed of rotation of the wheel.

13 Claims, 15 Drawing Figures

PROCESS AND DEVICE FOR AUTOMATIC REGULATION OF THE INTERNAL PRESSURE IN A PNEUMATIC TIRE

BACKGROUND OF THE INVENTION

The present invention relates to a process and device for the automatic regulation of the internal pressure within a pneumatic tire, and more specifically to a process and device for changing the internal pressure within a pneumatic chamber in a tire by utilizing the centrifugal force created by revolution of the wheel.

When a vehicle is running at a high speed, the internal pressure within the tire has to be increased to prevent the formation of a "standing wave". Conversely, when the vehicle is being braked or running at a low speed, it is desirable that the internal pressure of the tire be low so that the area of contact between the tire and the road surface may be increased.

So far as applicant is aware, no attempt has ever been made to automatically regulate the internal pressure within the tire in dependence on the running conditions without sacrificing the airtightness of the tire.

SUMMARY OF THE INVENTION

The object of the present invention is to provide a process and device for automatically regulating the internal pressure within a tire in dependence upon its operating conditions.

Another object of the present invention is to provide a process and device by means of which the internal pressure within the tire can be regulated without sacrificing the airtightness of the tire.

Still another object of the present invention is to provide a device for regulating the internal pressure within a tire, said device being characterized by the fact that the centrifugal force created by revolution of the tire is caused to act on a liquid or a solid, and air is forced into the pneumatic chamber of the tire by displacement of said liquid or solid.

Still another object of the present invention is to provide a device for regulating pneumatic pressure which is installed independently for each tire.

Still another object of the present invention is to provide a device which can regulate the internal pressure of the tire by responding quickly to a change in the speed of rotation of the tire.

The other objects of the present invention will become apparent from the following detailed description thereof, and reference to the accompanying drawings in which:

FIGS. 1a and 1b show a tire at rest or operating at a low speed while utilizing the device according to the present invention, FIG. 1a being an elevational view partly in section, and FIG. 1b being a sectional view taken along the line I—I of FIG. 1a;

FIGS. 2a and 2b show the configuration of a tire during high speed operation with the device according to the present invention in use, FIG. 2a being an elevational view partly in section and FIG. 2b being a sectional view taken along the line II—II of FIG. 2a;

FIGS. 7a and 7b and FIGS. 8 and 9 illustrate another embodiment of the present invention, FIG. 7a being a vertical section taken through the device for supplying air to the tire when at rest or operating at a low speed, FIG. 7b a vertical sectional view taken through said device when operating at high speed;

DETAILED DESCRIPTION OF THE INVENTION

In FIGS. 1a and 1b and FIGS. 2a and 2b, there is installed, on the outside of the rim 2 of a pneumatic tire 1 which is attached to the body of a vehicle, a pressure chamber 3 which constitutes an air-supply device coaxial with the axle S. This pressure chamber 3 has a large-diameter part 3A and a small-diameter part 3B which are coaxial with the axle S. The large-diameter part 3A holds an annular air bag 6 which communicates through a pressure-resistant hose 7 with the pneumatic chamber 8 in the tire 1. The inside of the two parts 3A, 3B of the chamber is filled with a liquid (preferably one with a high specific gravity) and said small-diameter part 3B is sealed by a cover 5 of elastic material which extends over its inner wall. Hence, the small-diameter part 3B serves as a chamber for receiving liquid and the large-diameter part 3A serves as a chamber for pressurizing the air bag. Furthermore, between the lid 11 which closes the small-diameter part 3B of the chamber 3 and the back plate 9 behind the elastic cover 5, a spring 10 is inserted to exert resilient pressure on the liquid 4. At the same time, a partition wall 12 diametrally traverses the large-diameter part 3A of the pressure chamber 3 and is submerged in the liquid 4. The pneumatic chamber 8 in the tire 1 communicates through a pressure-resistant hose 7 with the air bag 6, which receives the pressure of the liquid 4, which also acts on the pneumatic chamber 8. The spring 10 which serves to pressurize the liquid 4 can be adjusted by adjusting the tightness of the lid 11.

Figure 1A:
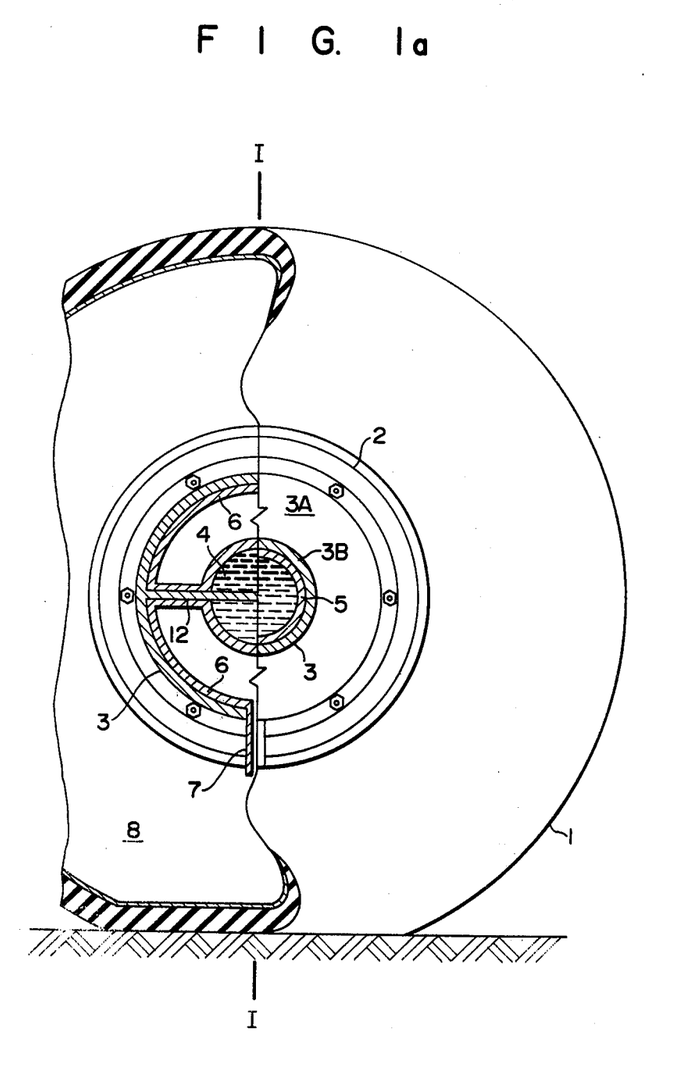
Figure 1B:
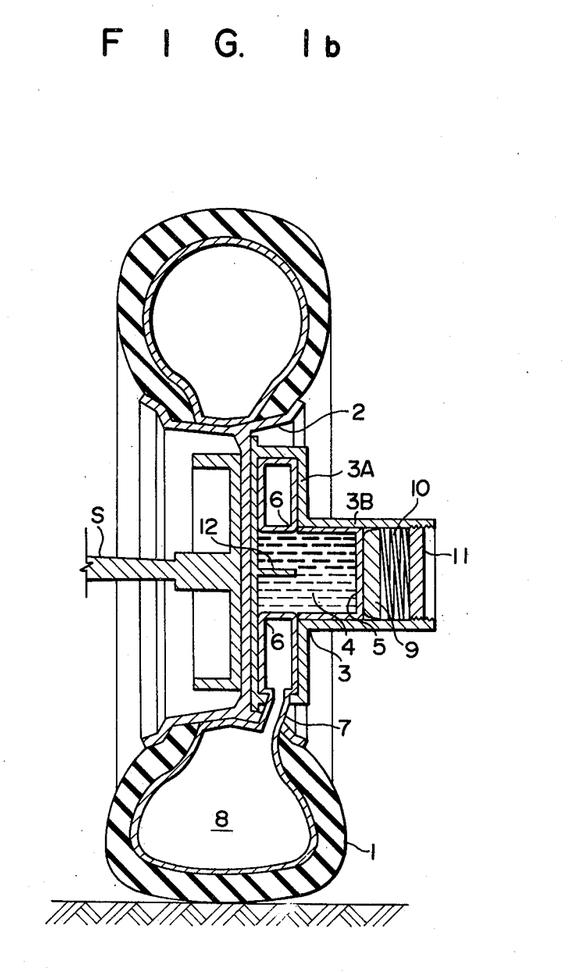

In the embodiments of FIGS. 1a and 1b, when a vehicle is at rest, in other words when the tire 1 is not rotating, the pressure in the pneumatic chamber 8 in the tire is transmitted to the air bag 6 and overcomes the force of the spring 10, so that the back plate 9 is pushed outward, thus causing the cover 5 to expand along the small part 3B of the pressure chamber 3. As a result, the pressure in the pneumatic chamber 8 in the tire 1 drops; the contact surface between the tire 1 and the ground is flattened under the weight of the vehicle body; and with the increase in contact area, the traction and the braking force of the tire 1 become larger. The partition wall 12 provided within the large-diameter part 3A of the pressure chamber 3 traverses the central part of the large-diameter part 3A and serves as a fan blade which causes a rotational movement of the internal liquid synchronous with the revolution of the tire.

Figure 2A:
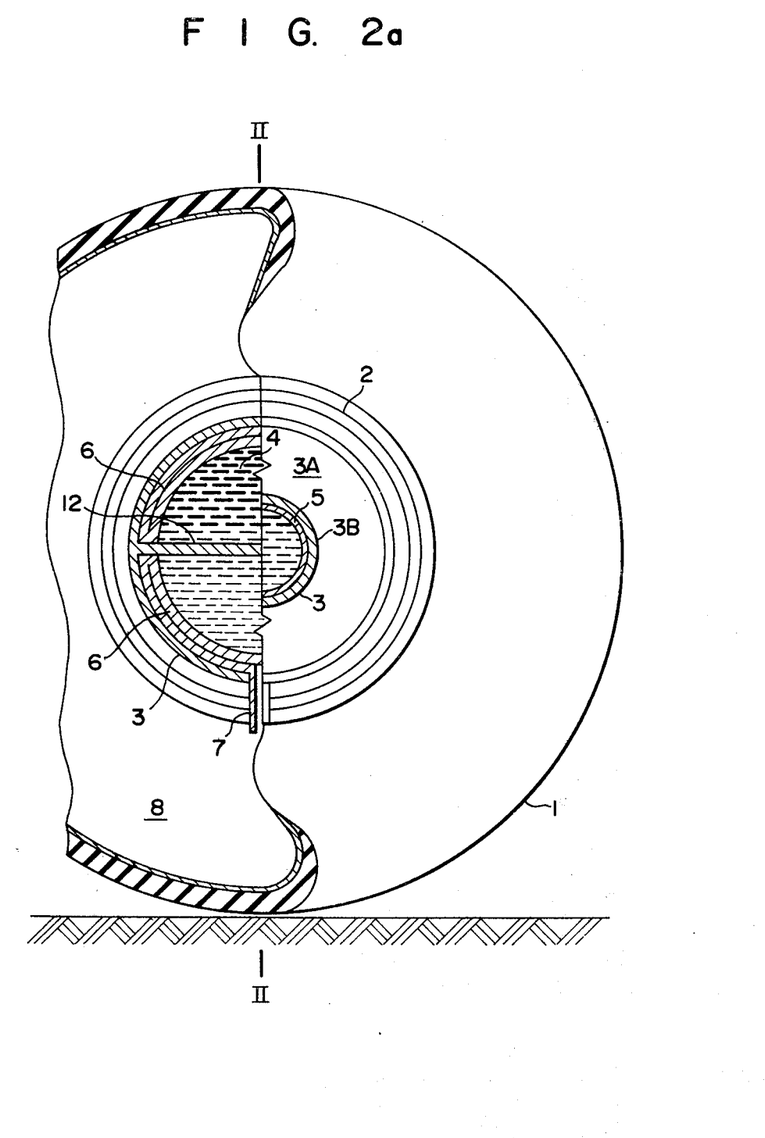
Figure 2B:
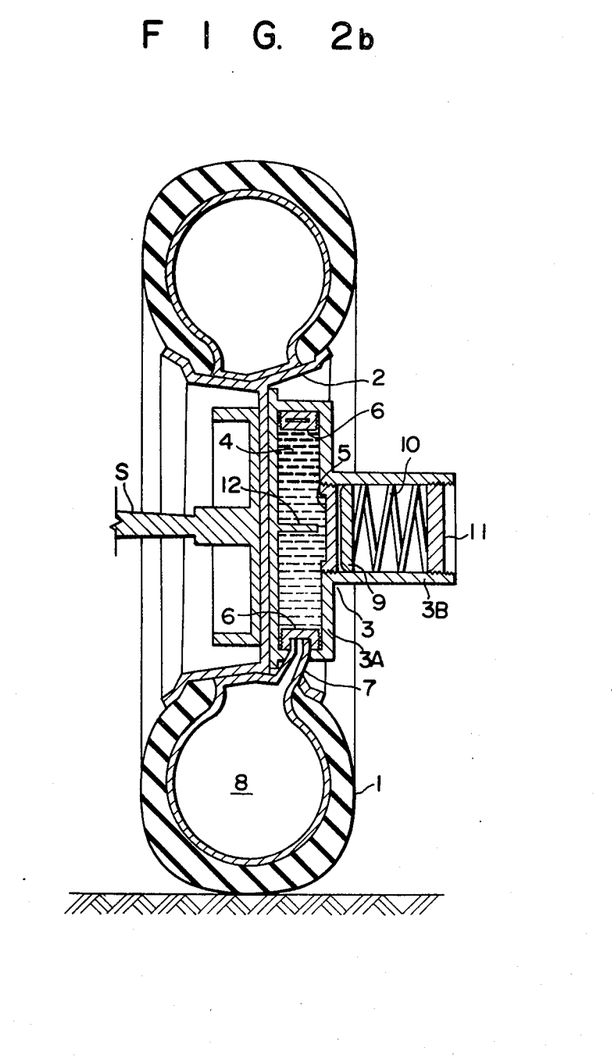

Thus as the tire 1 rotates when a vehicle runs, the partition wall 12 agitates the liquid 4, which then begins a rotational movement within the pressure chamber 3; and the centrifugal force created by said rotational movement of the liquid 4 presses the air bag 6 against the inside of the large-diameter part 3A of the chamber 3 as shown in FIGS. 2a and 2b. The gas in the air bag 6 is thereby forced through the pressure-resistant hose 7 into the pneumatic chamber 8 and as a result of the pressure within the pneumatic chamber 8 rises, inflating the tire 1. Thereafter the centrifugal force created by the liquid 4, i.e., the force of the liquid 4 acting on the air bag 6, increases or decreases in proportion to the speed of rotation of the tire 1. Therefore, when the vehicle is running fast and the speed of rotation of the tire 1 is high, the internal pressure in the pneumatic chamber 8 is high, and the tire 1 inflates to its maximum as illustrated in FIGS. 2a and 2b, with a consequent decrease in the area of contact with the ground. There is accordingly no likelihood that a standing wave will develop in the tire 1. When a vehicle operating at high speed is braked and the speed of rotation of the tire 1 decreases, or when the tire 1 ceases to rotate, the rotational movement of the liquid 4 within the pressure chamber 3, being impeded by the partition wall 12, is suddenly damped; and since the centrifugal force vanishes, the internal pressure within the tire 1 drops sharply, and as indicated in FIGS. 1a and 1b, so that the contact surface of the tire 1 is flattened. This is also true when the vehicle is at rest. The spring 10 pressurizes the liquid 4 to keep its pressure equal to the internal pressure within the pneumatic chamber 8 and when the tire 1 begins to rotate, the centrifugal force created by the liquid 4 again increases the pressure within the pneumatic chamber 8.

Figure 3:
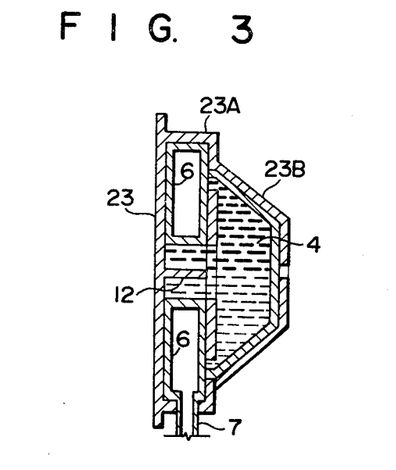
FIGS. 3 and 4 illustrate a different embodiment of the present invention, FIG. 3 being an axial sectional view taken through the device for supplying the air to the tire when at rest or rotating at a low speed, and FIG. 4 an axial sectional view taken through said device when operating at high speeds.
Figure 4:
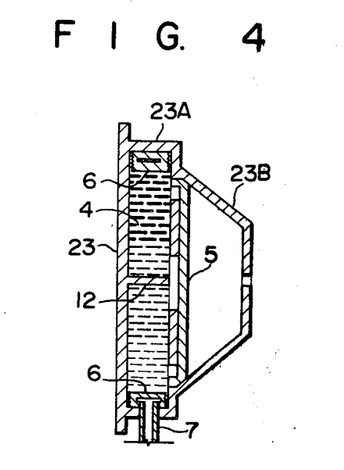

In the embodiment illustrated above, the spring 10 exerts a pressure on the liquid 4 at all times. When it is desirable that the pressure within the pneumatic chamber 8 be applied only after the tire 1 has attained a certain speed of rotation, the back plate and the spring have only to be eliminated, as shown in FIGS. 3 and 4, from the small-diameter part 3B of the pressure chamber 3. In that case, however, in the pressure chamber 23 of FIGS. 3 and 4 the small-diameter part 23B is located facing the large-diameter part 23A and the small-diameter part 23B tapers outwardly as it approaches the large-diameter part 23A to provide inclined faces, in order to help smooth the flow of the liquid 4 sealed within the small-diameter part 23B into the large-diameter part 23A in response to centrifugal force. FIG. 3 illustrates the pressure chamber of a vehicle at rest or operating at a low speed, while FIG. 4 illustrates this chamber while the vehicle is operating at high speed.

Figure 5:
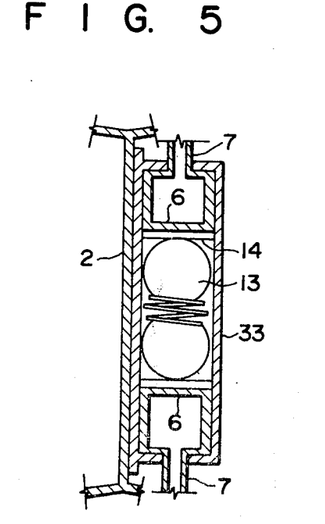
FIGS. 5 and 6 illustrate another embodiment of the device for forcing the air into the tire, FIG. 5 being an axial sectional view and FIG. 6 an elevational view.
Figure 6:
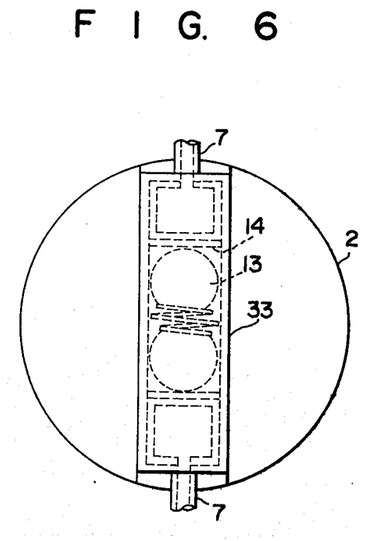

FIGS. 5 and 6 illustrate the use of a solid as the means for pressurizing the air bag in response to centrifugal force. In FIGS. 5 and 6 a plurality of spring-loaded weights are provided internally at the center of the pressure chamber 33 and pressure plates 14 are inserted between the weights 13 and the air bag 6 communicating with the inside of the tire. In this embodiment, as the tire rotates, the weights 13 are urged toward the air bag 6 so as to move the pressure plate 14 in response to the centrifugal force created by the revolution of the pressure chamber 33. Thus since the pressure plate 14 is displaced to compress the air bag 6, air is forced into the tire, thereby inflating the tire.

FIGS. 7a, 7b, 8 and 9 show another embodiment of the present invention. In this embodiment, a large-diameter chamber 43A pressurizing the air bag and a small-diameter chamber 43B which serves as a liquid-receiving chamber are concentrically located. The air bag 6 which communicates with the tire is inserted into the large-diameter chamber 43A. A space 47 is formed between an end plate 42 covering the outer plate of the main pressure chamber 43 and a wall plate 41 extending from said small-diameter chamber 43B. The large-diameter chamber 43A communicates with the small-diameter chamber 43B through an opening 44 provided in the outer part of the space 47.

Figure 7A:
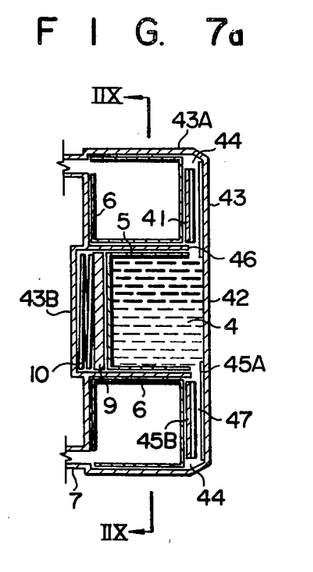
Figure 7B:
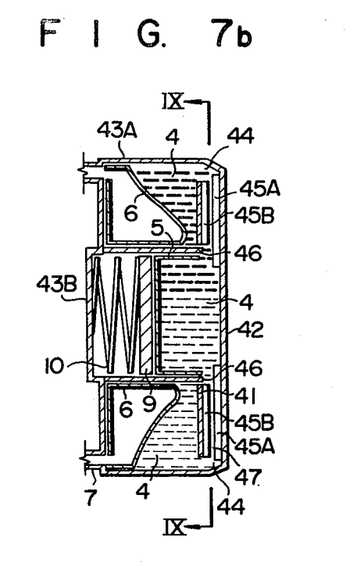
Figure 8:
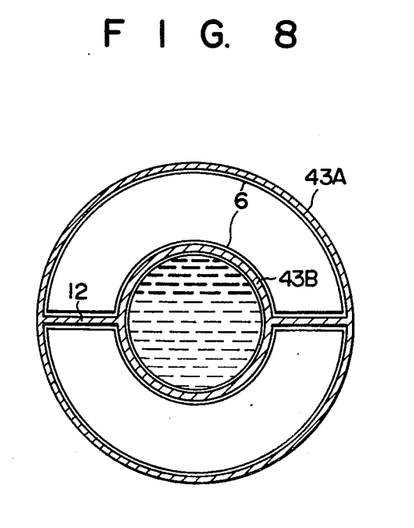
FIGS. 8 and 9 are cross-sectional views taken along the line IIX—IIX of FIG. 7a and the line IX—IX of FIG. 7b, respectively.
Figure 9:
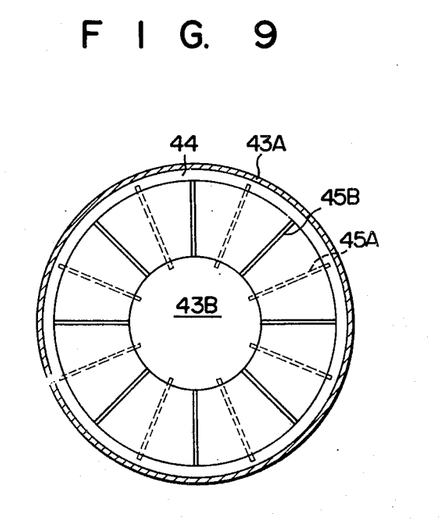

Furthermore, a plurality of vanes 45A, 45B extending radially as shown in FIG. 9, are provided on each of those surfaces of the end plate 42 and the wall plate 41 which face each other. A return pipe 46 for returning liquid forced into the large-diameter chamber 43A is provided in the wall plate 41 facing the centrifugal force-generating space 47. The inside of the small-diameter chamber 43B is sealed with a liner 5 similar to the coating in the previously described embodiment, while a spring 10 is provided between the inner end of the small-diameter chamber 43B and pressure plate 9, which is applied to the face of the liner 5, whereby compressive force acts on the liquid enclosed in the small-diameter chamber 43B. The vanes 45A, 45B provided in the space 47 which communicates with the small-diameter chamber 43B and the large-diameter chamber 43A act as a centrifugal pump as the wheel rotates and therefore as illustrated in FIG. 7b force liquid 4 through the opening 44 into the large-diameter chamber 43A so as to pressurize the air bag 6, and thereafter drive the air enclosed in the air bag into the tire. When the speed of rotation of the tire of a wheel decreases, or the wheel comes to a stop, the air bag 6 is, as shown in FIG. 7a, restored to its original position by receiving pressure from the pneumatic chamber of the tire. In this case, the liquid forced into the large-diameter chamber 43A is reintroduced into the small-diameter chamber 43B by returning it through the return pipe 46 into the space 47.

In this embodiment, by revolution of the vanes 45A, 45B extending radially from the small-diameter part 43B, strong centrifugal force is applied to the liquid 4 within the space 47, and the coefficient of the centrifugal force generated can be increased as compared with that in the previously described embodiment by the introduction of pressure fluid through the opening 44 into the large-diameter chamber 43A. Furthermore, the construction may be simplified because the small-diameter chamber 43B is installed inside the large-diameter chamber 43A.

Figure 10:
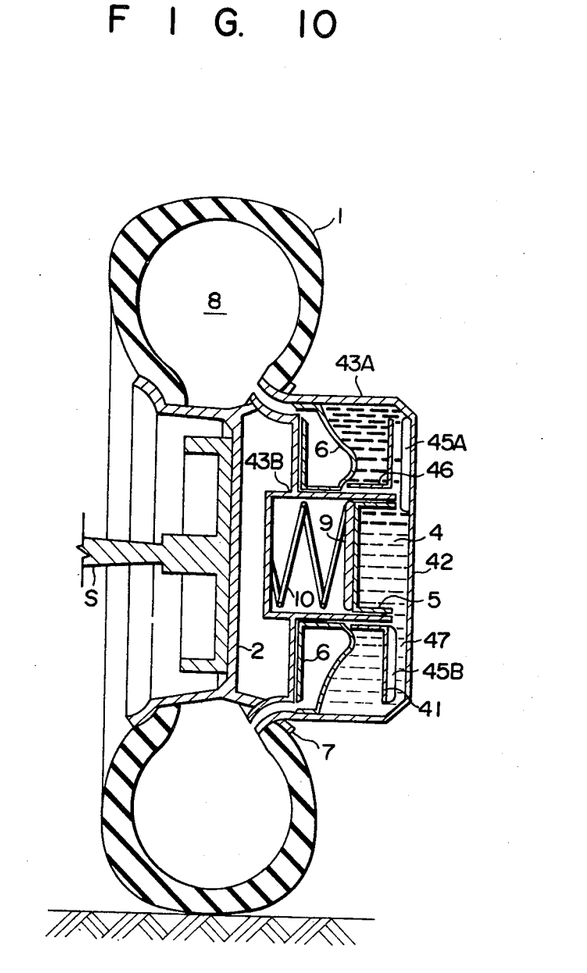
FIGS. 10 and 11 are axial sectional views showing respectively, embodiments of a wheel equipped with the embodiments of the device for supplying air to the tire shown in FIGS. 7a and 7b to 9.
Figure 11:
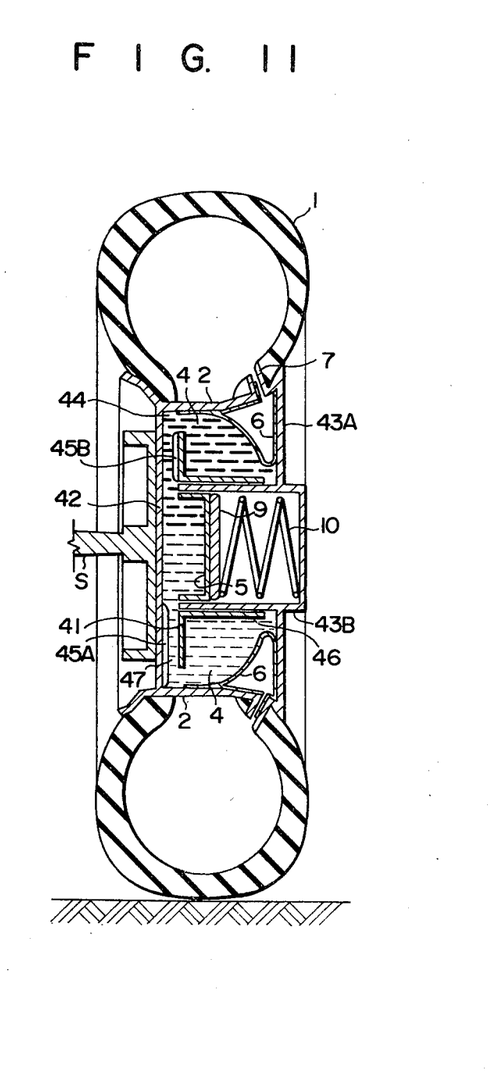

It goes without saying that the air-supply device shown in this embodiment can be attached to the rim of the conventional pneumatic tire, as shown in FIG. 10, or it can be so made that no portion of the air-supply device protrudes outside of the wheel, as shown in FIG. 11, if the pressure chamber which is contained within the range of the width of the tire and serves as the air-supply source, is fitted inside the inner periphery of the tire, and if the wheel is manufactured with the air-supply device incorporated inside of the tire.

Furthermore, the form of the wheel can be made compact so that the air-supply device can be protected from accidents due to collisions or the like.

The pressure of the pneumatic chamber in the tire may also be changed by directly compressing the air bag installed within the casing by using the shaft of a speed-regulator to force the air into the pneumatic chamber of the tire.

Figure 12:
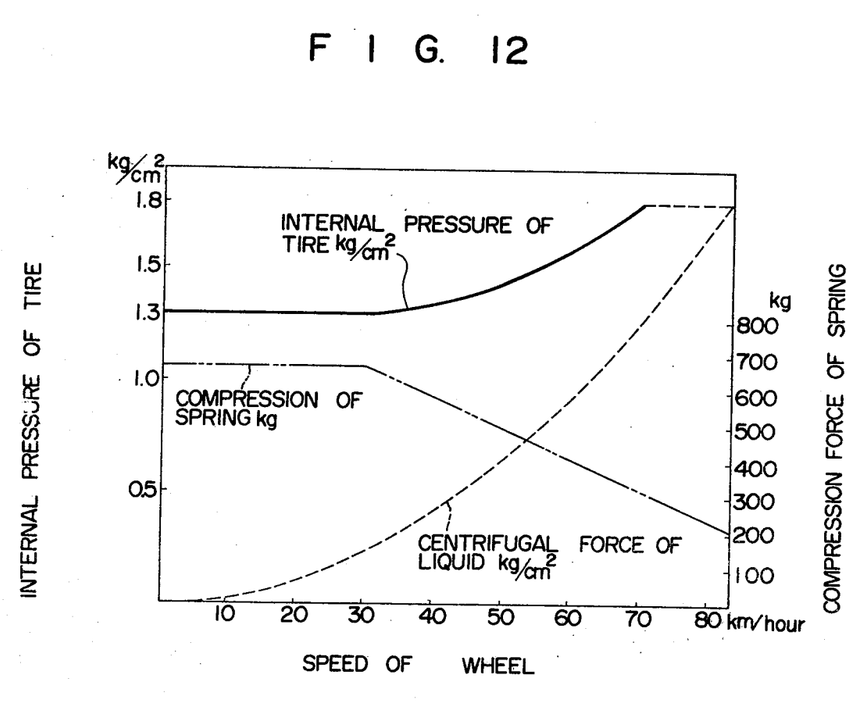
FIG. 12 is a characteristic curve showing the relationship between the internal pressure within the tire and the speed of the vehicle in the case of the tire shown in FIG. 10.

In FIG. 12, the relationship between the inner pressure of a tire and the speed of rotation of a wheel is shown as one example of design when the device according to the present invention is applied to a pneumatic tire of the form shown in FIG. 10, in which the tire is of the 14–7000 Type; the diameter of the air-supply device is 40 cm; the width thereof is 17 cm; the diameter of the space 47 is 28 cm; the enclosed liquid is a heavy liquid having a specific gravity of 2.7 g/cm; the spring constant of the spring 10 is 3 kg/mm; and the maximum reaction force is 672 kg.

As described above, according to the present invention the pressure within the pneumatic chamber of tire is varied by utilization of the centrifugal force created by rotation of the tire. Therefore the pressure within the pneumatic chamber of the tire can be regulated in accordance with its speed of rotation. Accordingly it is possible to adjust the tire pressure in dependence on the speed at which the vehicle is operating, thereby assuring the safety of operation. When the vehicle is at rest, the pneumatic chamber can be maintained at low pressure with no unreasonable stress on the material of the tire, thereby producing increased durability of the tire.

What is claimed is:

1. Method of automatically regulating the pressure within a pneumatic tire which comprises the steps of
   providing centrifugal means positioned radially inward of said tire which is mounted to rotate when said tire is rotated, and to exert a radially outward pressure during such rotation, and
   placing said centrifugal means in pressure-exchange relationship with the interior of said tire, whereby rotation of said tire and centrifugal means results in adding the radially outward pressure exerted by said centrifugal means to the original pressure with said tire when, but only when, said tire and centrifugal means are rotating.

2. Method for automatically regulating the pressure within a pneumatic tire, which comprises the steps of sealing the air within an air bag communicating with a pneumatic chamber of tire; compressing said air bag by the centrifugal force created with rotation of the wheel; forcing the air in said air bag into the pneumatic chamber of tire; and automatically changing the internal pressure of the pneumatic chamber of the tire in dependence of its speed of rotation.

3. Device for automatically regulating the internal pressure within a pneumatic tire having a fluid-tight pneumatic chamber therewithin, said device comprising a flexible bag made of elastic material communicating with said pneumatic chamber and containing a fluid under pressure, and means responsive to the centrifugal force created by rotation of said tire for exerting on said flexible bag a compressive force proportional to the speed of said rotation.

4. Device as claimed in claim 3 in which said means for compressing said air bag comprises a solid weight mounted for displacement radially of said tire in response to centrifugal force.

5. Device as claimed in claim 2 in which said means for compressing said flexible bag is a liquid-filled circular pressure chamber the liquid in which is forced radially outward when said liquid is subjected to centrifugal force, and said flexible bag is annular and lies in the path of said outwardly moving liquid so as to be compressed as said liquid is forced outward.

6. Device as claimed in claim 5 in which said pressure chamber is mounted coaxially on the rotating axle of a wheel.

7. Device as claimed in claim 5 comprising a transverse vane within said pressure chamber which causes said liquid to rotate as the tire rotates.

8. Device as claimed in claim 5 comprising means in said pressure chamber for pressurizing said liquid.

9. Device as claimed in claim 5 in which said pressure chamber comprises two sections having different diameters which are in communication with each other, and in which a peripheral portion of the section having a larger diameter receives said flexible bag.

10. Device as claimed in claim 6 in which said pressure chamber comprises coaxial large-diameter and small-diameter compartments which are located facing each other, and said flexible bag is in the large-diameter compartment while the small-diameter compartment is provided with inclined faces extending toward the periphery of the large-diameter compartment.

11. Device as claimed in claim 5 in which said pressure chamber comprises a compartment containing liquid which is located in its central portion and a compartment in pressure-exchange relationship with the air bag which encircles the compartment containing liquid, and both compartments communicate with each other through a chamber having vanes on the walls thereof for impelling the liquid therein so that centrifugal force is generated thereby.

12. Device as claimed in claim 3 in which said pressure chamber is mounted on a vehicle wheel carrying said tire.

13. Device as claimed in claim 5 in which said pressure chamber lies inside the inner periphery of the tire and forms a part of a wheel carrying said tire.

* * * * *